Aug. 23, 1966  G. P. MICHELSON  3,267,854
MISSILE
Filed Dec. 17, 1963  3 Sheets-Sheet 2
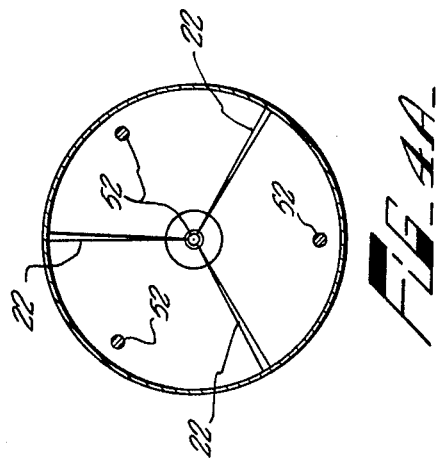
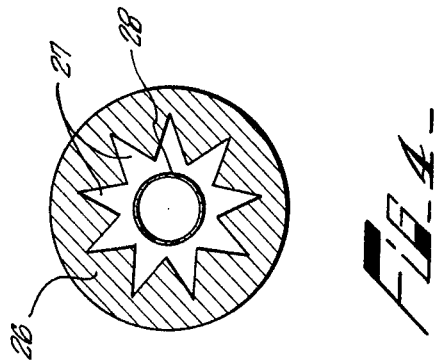
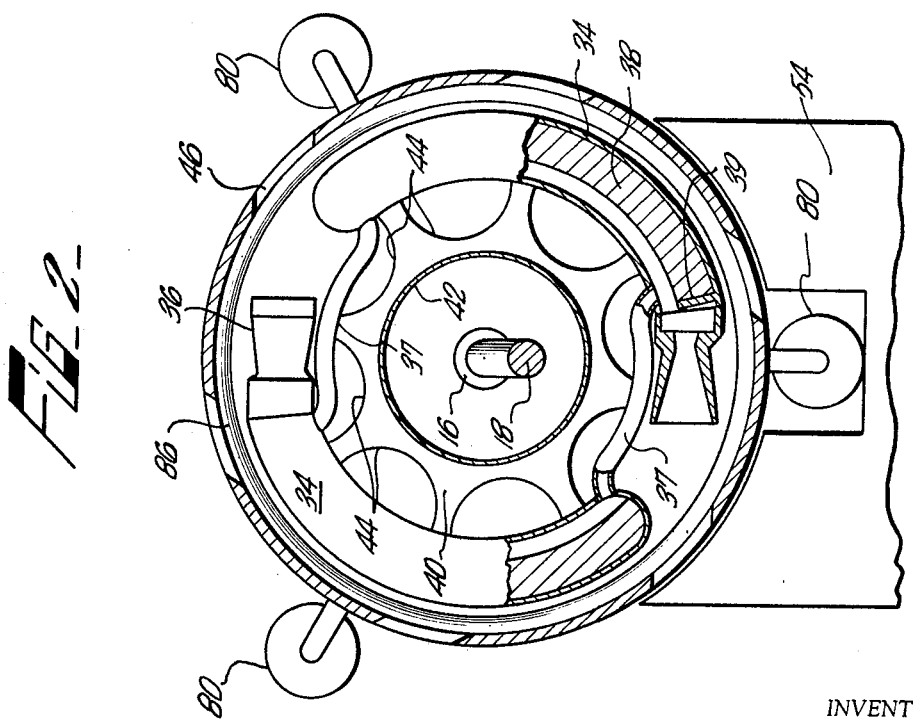
INVENTOR.
GUNNAR P. MICHELSON
BY
*Christie, Parker & Hale*
ATTORNEYS.

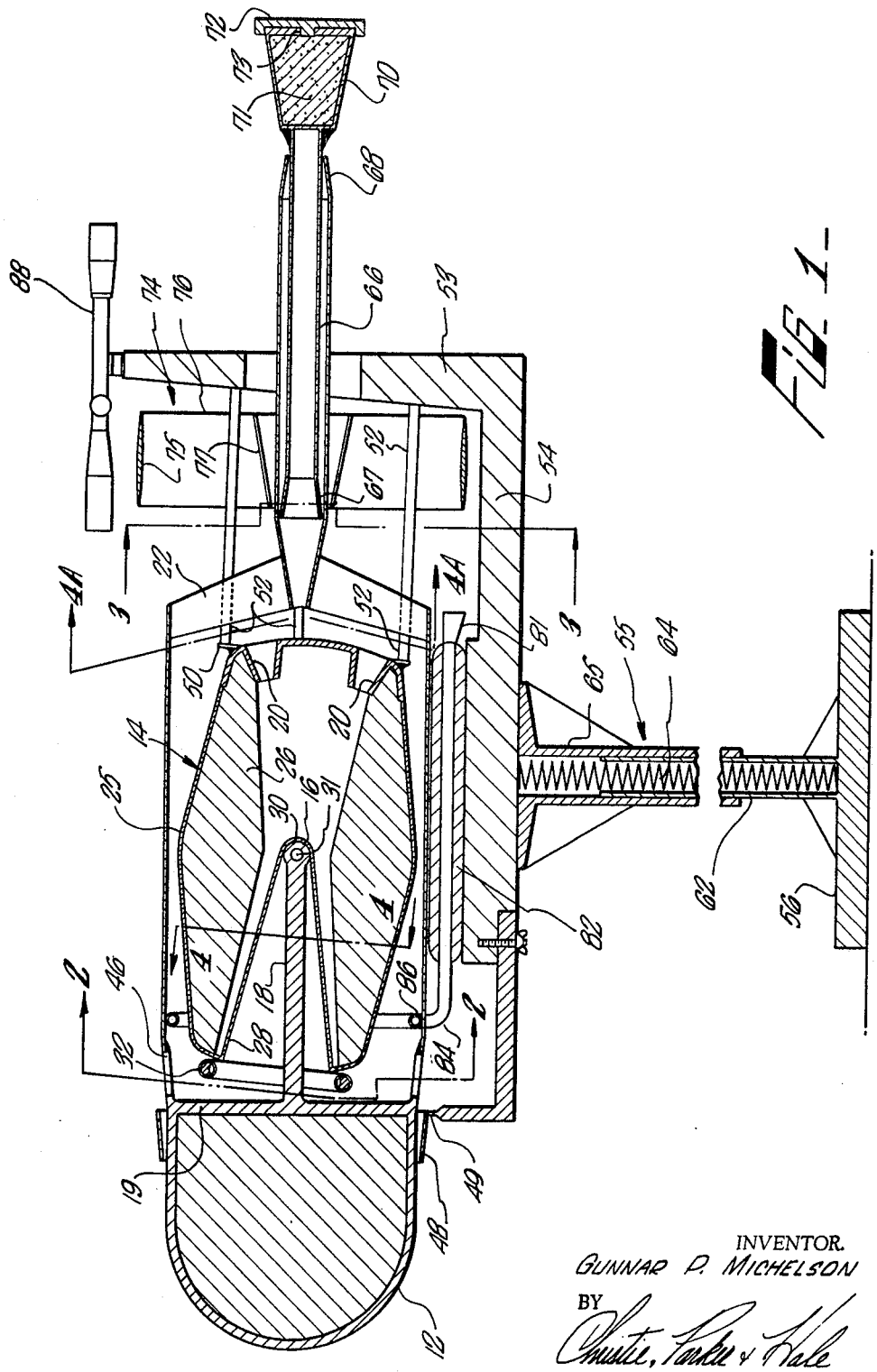

Aug. 23, 1966  G. P. MICHELSON  3,267,854
MISSILE
Filed Dec. 17, 1963  3 Sheets-Sheet 3
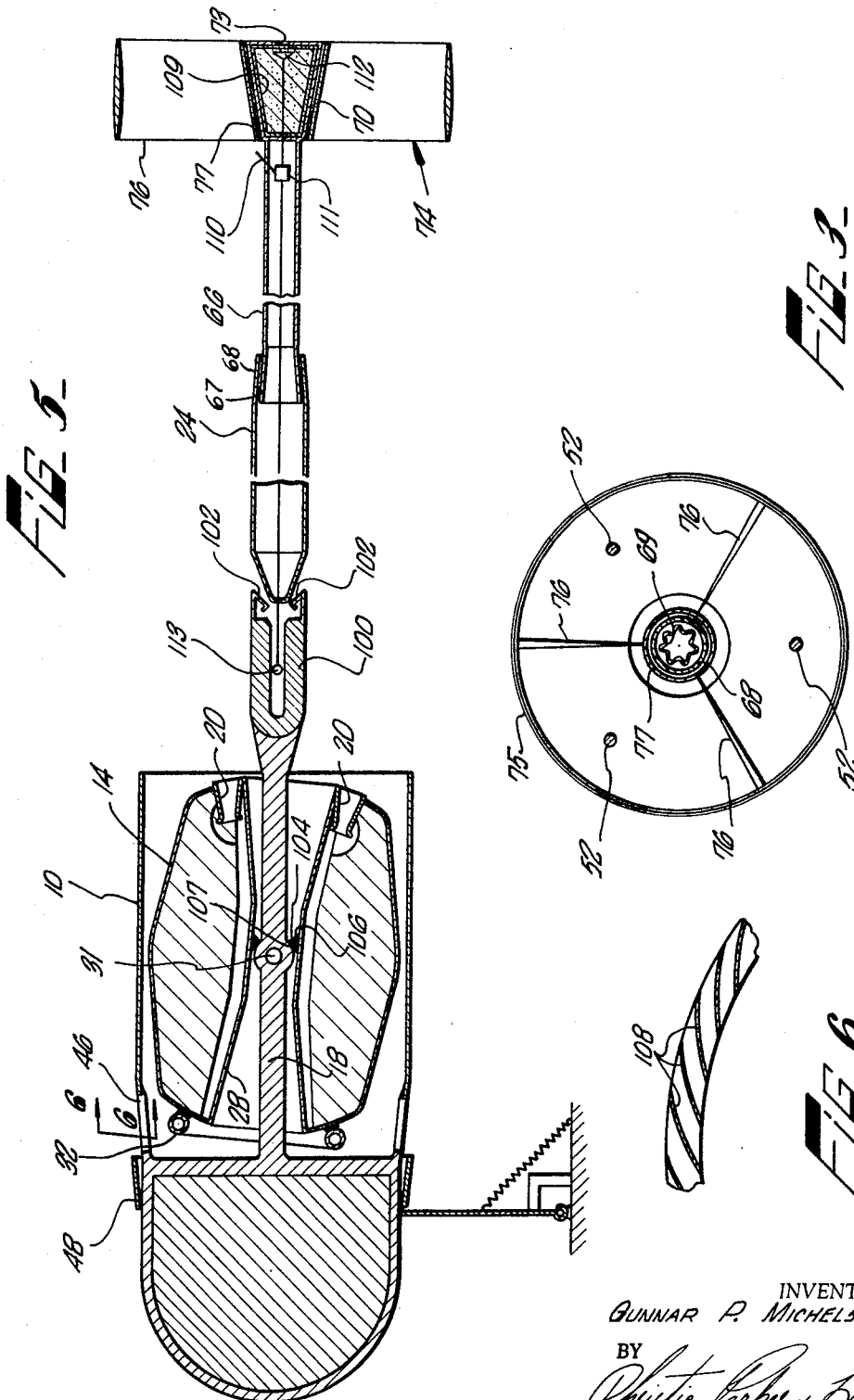
INVENTOR.
GUNNAR P. MICHELSON
BY
Christie, Parker + Hale
ATTORNEYS.

United States Patent Office 3,267,854
Patented August 23, 1966

3,267,854
MISSILE
Gunnar P. Michelson, 505 Sea Ranch Drive,
Santa Barbara, Calif.
Filed Dec. 17, 1963, Ser. No. 331,300
40 Claims. (Cl. 102—49)

This invention relates to missiles and to propulsion systems for delivering missiles in approximately a straight line from a launching site to a target.

In accordance with this invention, a main rocket motor is disposed within a missile housing. One or more discharge nozzles on the rocket motor are directed toward the exhaust opening in the rear of the missile housing. The main rocket motor is suspended from the housing so the motor can spin and swivel with respect to the housing. Means are provided for rotating the main motor within the housing so that once the rocket motor is spinning about an axis, it exerts a gyroscopic effect and tends to maintain the same direction of its original spin axis even though the missile housing may swivel with respect to the main rocket motor. Since the main rocket motor is within the housing, the motor is shielded from aerodynamic forces which otherwise might cause it to precess and deviate from its original spin axis.

Preferably, the ratio of the thrust of the main rocket motor to the weight of the missile is made as constant as possible throughout the powered portion of the flight of the missile.

The center of gravity of the main rocket motor is preferably positioned to be identical with the center of gravity of the missile, and the rocket motor swivels with respect to the missile about a point which is approximately identical with the center of gravity of the rocket motor and the missile.

In the preferred form, the main rocket motor is rotated by a spin-up rocket motor which produces a torque around the spin axis of the main motor in a manner similar to the well known fireworks pinwheel. A flat bearing surface, which is normal to the axis of rotation to the main rocket motor, is provided on the motor and arranged to slide against a matching surface on a launcher so that the main rocket motor is held aligned on its intended spin axis during the spin-up produced by the spin-up motor. Preferably, the spin-up motor is mounted on the main motor within the housing. Alternatively, the main motor can be rotated by a spin-up motor exterior of the housing.

To provide greater stability during the initial part of the missile flight, when its speed is relatively low, a releasable mass is secured to the tail of the missile. Because of the high longitudinal acceleration of the missile during its initial period of flight, the releasable mass gives the missile a large restoring moment against any forces, say, a cross wind, which would tend to deflect the missile initially from its intended line of flight. As the missile increases speed, the mass in the tail is of no further use, and it is released.

To facilitate launching and avoid the need of a long launching tube, the tail is preferably constructed to telescope from a compact or collapsed position at launch to an extended position during flight.

In one form, the missile housing includes side vents for the discharge of gas from the spin-up motor. A slip ring is disposed around the missile housing ahead of the side vents, and is caused to slide back and cover the side vents after the spin-up motor has brought the main rocket motor up to rotational speed and burned out. Conveniently, the slip ring is caused to cover the side vents due to its inertia when the main rocket motor is fired to launch the missile.

The missile is aerodynamically stable, so that it tends to head in to the resultant wind acting on it. Thus, if there is a cross wind, the missile will head into the vector produced by the cross wind and the thrust of the main rocket motor.

Preferably, one or more drag compensating rocket motors are provided on the missile to exert a net thrust to the rear and along the longitudinal axis of the missile houisng to compensate for the drag on the missile. The missile housing will be deflected off its flight path in proportion to the strength of the cross wind, and the drag-compensating motor will produce a thrust which compensates for the drift imposed by the cross wind. At launch, the spin axis of the main rocket motor is tilted in a vertical plane against the flight path of the missile to such an extent that the vertical component of the main motor's thrust is equal to the instantaneous weight of the missile so that the missile travels along a substantially straight line rather than along one which would curve downwardly if the spin axis of the main motor were parallel to the sight line.

Since the missile is aerodynamically stable, it cerates zero lift. To cancel out the effects of any slight residual transverse areodynamic forces, it is caused to rotate during flight about its longitudinal axis at a moderate and increasing rate.

Preferably, the ends of the main rocket motor are given a spherical shape which is concentric to its center of gravity to minimize any aerodynamic forces which might occur at the rear end of the motor.

These and other aspects of the invention will be more fully understood by the following detailed description and the accompanying drawings, in wihch:

FIG. 1 is a schematic longitudinal sectional elevation of one form of the invention;
FIG. 2 is a view taken on line 2—2 of FIG. 1;
FIG. 3 is a view taken on line 3—3 of FIG. 1;
FIG. 4 is a view taken on line 4—4 of FIG. 1;
FIG. 4A is a view taken on line 4A—4A of FIG. 1;
FIG. 5 is a longitudinal sectional elevation of another embodiment of the invention; and
FIG. 6 is a view taken on line 6—6 of FIG. 5.

Referring to FIG. 1, an elongated horizontal hollow cylindrical missile housing 10 has a payload or war head 12 secured to its front (left, as viewed in FIG. 1) end.

A main rocket motor 14 is disposed within the housing on a spherical bearing 16 mounted at the rear end of a horizontal spike 18 attached at its forwardward end to the rear face of a transverse bulkhead 19 at the rear of the payload. The rocket motor includes nozzles 20 that open rearwardly toward the rear end of the missile, which is open, except for radially extending structural vanes 22 attached at their outer ends to the rear end of the missile housing and at their inner ends to the forward end of an outer, hollow, horizontal and rearwardly extending tail sleeve 24.

As shown in FIG. 4A, the structural vanes 22 secured to the rear of the missile housing increase slightly in transverse cross section with distance from the longitudinal axis of the missile to present a slightly increasing aerodynamic drag with increasing distance from the longitudinal axis of the missile. The thin edge of each vane points toward the motor. They are made either of a heat-resistant material, or provided with suitable conventional thermal insulation. The nozzles from the spinning main motor intermittently impinge on the structural vanes secured to the rear of the missile housing, and therefore exert forces on them. As long as the resultant force coincides with the spin axis of the main motor, the net result is a small reduction in the net thrust, which can be accurately predicted and compensated for in design of the main rocket motor thrust. Any deviation of the resultant drag force on the vanes from the spin axis would produce a component transverse to the flight path of the missile, and thus would impair accuracy. Therefore, to avoid this, the drag of each vane is made such that it increases in transverse thickness with increasing distance from the longitudinal axis of the missile to such an extent that the resultant drag force for all swivel angles of the main motor coincides with the spin axis of the main motor.

In addition to using the vanes to hold the tail, they are used to control or monitor the spin rate of the missile by arranging them at a small angle of attack with respect to the nozzles from the main rocket motor.

The main rocket motor is of maximum diameter near its center and tapers to a reduced diameter at each of its ends to facilitate swiveling of the main rocket motor with respect to the missile housing. In effect, the main motor is shaped approximately like two truncated cones attached at their bases or through a portion 25 which is a segment of a sphere. The ends of the rocket motor are segments of spheres with their centers at the center of bearing 16.

The nozzles of the main rocket motor are set to discharge gases outwardly with respect to the spin axis, and to produce a small vector component tangential to the spin axis which is equal to or larger than the anticipated friction torque at the bearing which supports the main rocket motor, and so the resulting thrust of the nozzles coincides or is collinear with the spin axis of the main motor.

The rear ends of the nozzles of the main rocket motor are substantially flush with the spherical surface at the rear end of the motor to minimize any perturbing aerodynamics effect on the motor. Of course, the spherical shape of the rear end of the motor can be replaced by any surface which is aerodynamically equivalent to spherical fairing.

The interior of the rocket carries an annular body of propellant 26 secured to the inside of the wall of the main rocket motor. The propellant is shaped so that as it burns, the ratio of the thrust of the main rocket motor to the weight of the missile is kept as constant as possible for any instant of powered flight, small temporary deviations not being critical as long as the average over a moderate time interval is constant. FIG. 4 shows a typical propellant star shape for obtaining this result. The annular body of propellant includes a plurality of inwardly and radially extending points 27 which present a gradually decreasing surface area for combustion during the burning of the propellant. The rate of decreasing thrust is proportional to the decreasing weight of the missile due to burning propellant. The length of the main rocket motor is substantially greater than its diameter to obtain a large ratio of moments of inertia and a large volume for a given diameter.

A forwardly opening conical recess 28, which tapers to a reduced diameter in a rearward direction, in the forward end of the rocket motor carries a spherical bearing 30 which rests on the spherical bearing 16 at the rear end of spike 18. The center 31 of the spherical bearings 16 and 30 is the center of gravity for both the missile and the main rocket motor.

A toroidal spin-up rocket motor 32 is secured to the forward end of the main rocket motor around the conical recess 28. As shown best in FIG. 2, the spin-up motor includes two arcuate chambers 34 which each terminate in nozzles 36 directed in opposite directions on opposite sides of the main longitudinal axis of the main rocket motor. The end of each chamber 34 opposite its respective rocket nozzle is connected by a respective bypass tube 37 to the adjacent end of the other chamber. The axis of each nozzle in the spin-up motor is approximately tangential to the recess in the forward end of the rocket motor. A conventional propellant 38 is disposed in the outer portion of each arcuate chamber 34, and it is prevented from discharging through the nozzle by a separate respective partial transverse partition 39 located adjacent each nozzle 36. The spin-up and main rocket motors are fired by any suitable conventional means (not shown). The arcuate chambers 34 are secured to the periphery of an annular spider 40 attached to the front end of the main motor and having a central circular opening 42 and outwardly opening semicircular recess 44 around its periphery.

Thus, when the spin-up motor is fired, it causes the main rocket motor to rotate in a counterclockwise direction (as viewed in FIG. 2) about the main longitudinal axis (spin axis) of the main rocket motor. Exhaust gases from the spin-up motor nozzles discharge through side vents 46 located around the periphery of the missile housing just to the rear of the payload. The side vents are shaped so that exhaust gas from the spin-up motor does not exert a torque on the missile. An annular slip ring 48 is disposed around the payload just forward of the side vents, and it flares outwardly and rearwardly to match a similar flare on the missile housing in the vicinity of the side vents. After the main rocket motor is spun up to the desired rate of rotation, the spin-up motor burns out and the main motor is fired to drive the missile forward. The inertia of the slip ring causes it to slide rearwardly with respect to the missile housing and seal the side vents so that air cannot enter them during the flight of the missile and exert any perturbing aerodynamic forces on the spinning main rocket motor.

In those cases where the inertia of the slip ring is small, additional means are provided to insure closing the travel of the slip ring with respect to the missile housing. This is done, for instance, by holding the ring to the launcher with weak structural tabs 49 with the weakest cross section being close to the ring so that the tabs sheer at the ring when the missile is launched.

The rear end of the main rocket motor carries a flat annular bearing plate 50 with its major plane perpendicular to the main longitudinal axis of the main rocket motor. The bearing plate is engaged at its rear surface by the forward ends of three horizontal spacer rods 52 bearing at their rear ends against an upright bracket 53 secured at its lower end to a launching platform 54 which rests on an upright telescoping column 55 secured at its lower end to a base 56. The forward ends of the spacer elements are arranged so the bearing plate 50 extends upwardly and slightly rearwardly so that the main longitudinal axis of the main rocket motor, i.e., the spin axis of the main motor, is tilted in a vertical plane against the flight path of the missile to such an extent that the vertical component of the main motor's thrust will equal the instantaneous weight of the missile. Thus, when the missile is launched, it does not fall during flight, but instead follows a substantially horizontal path.

To compensate for the effect of temperature on the thrust developed by the main rocket motor, the spacer rods disposed below the spin axis of the main rocket motor are made of a material with smaller coefficient of thermal expansion than the material of those rods above it. The spacer rods and main motor are designed so that they have approximately equal thermal inertia, i.e., they heat and cool at about the same rate. As ambient temperature increases, the temperature of the propellant in the main rocket motor also increases and the rocket develops a greater thrust than in cold weather. This would cause the rocket to fire higher in hot weather than in cold because of the slight tilt of the spin axis. To compensate for this effect, the lower spacer rods do not expand longitudinally as much as the upper rods. Therefore, when temperature increases, the upper rods expand a slightly greater length than the lower rods, causing the spin axis of the main motor to be less elevated than in cold weather. When the temperature decreases, the longer rods contract more and cause the spin axis of the main motor to be tilted slightly higher to provide the required vertical component to overcome gravity. When the missile is aimed for launching, it is slipped rearwardly on the platform until the flat bearing plate firmly engages the forward ends of the spacer rods which automatically incline the spin axis of the main motor at the proper angle for launching under ambient temperature conditions.

The telescoping column 55 includes an outer vertical sleeve 60 which makes a close sliding fit down over an inner vertical sleeve 62 in which is disposed a compression spring 64 that bears at its lower end against the base and at its upper end against the platform. The strength of the compression spring is just adequate to support the weight of the missile so that the operator can raise and lower the missile to any desired height and hold it in that position with minimum effort, most of the weight of the missile being supported by the compression spring.

An inner tail sleeve 66 is coaxially disposed within the outer tail sleeve 24 and includes a forwardly and outwardly tapered conical section 67 which engages an inwardly and rearwardly tapering conical section 68 at the rear end of the outer tail sleeve when the missile is fired.

As shown best in FIG. 3, the inside surface of inner conical section 67 at the forward end of the inner tail sleeve has corrugations 69 so that when it is picked up by the conical section 68 of the outer tail sleeve, the inner cone is forced to decrease its diameter slightly, with the result that the shock energy is absorbed by the deformation of the corrugations and by friction. The inner cone 67 has sufficient strength to resist being deformed to a diameter smaller than the minimum diameter of tapered portion 68 so the inner tail sleeve cannot slip out of the outer sleeve.

The rear end of the inner tail sleeve 66 carries an outwardly and rearwardly tapered hollow chamber 70. A releasable fluid mass 71, such as water or sand, is disposed in chamber 70 and held in place by a plug 72 which fits into an orifice 73 at the rear end of chamber 70.

A longitudinally slidable fin assembly 74 includes an outer annnular fin 75 connected by three equi-angularly spaced radial fins 76 to a central hub 77 which tapers rearwardlly and outwardly to make a slip fit around the forward portion of outer tail sleeve 24 just in front of the launching bracket 53 which holds the rear ends of spacer rods 52. The rods extend through the fin assembly between the radial fins. When the missile is launched, the tail is extended and the tapered hub 77 is picked up by chamber 70, which makes a snug fit in the hub. The rear end of hub 77 strikes plug 72 and knocks it off of chamber 70 so that the releasable mass is forced to flow by acceleration of the missile through orifice 73. During the initial flight of the missile, the releasable mass gives a large restoring moment to the missile and limits yawing at launch. After the missile attains speed, the mass is no longer necessary, and it is discharged.

Three drag-compensating rocket motors 80 are secured 120° apart around the exterior of the missile housing. Each compensating motor includes a rearwardly opening nozzle 81 which is directed slightly away from the axis of the missile to minimize perturbations on the fin assembly. The resulting thrust of the three compensating motors is collinear with the longitudinal axis of the missile. Each compensating motor includes an annular body 82 of propellant, and is connected at its forward end through a bypass line 84 through the missile housing wall to an annular pressure-equalizing manifold pipe 86 secured inside the forward end of the missile chamber. By interconnecting the motors at their front ends, pressure equalization of thrust from each compensating motor is obtained, and increased reliability is gained, because if one of the igniters (not shown) for a drag-compensating motor should malfunction, the motor is still ignited by the hot gases flowing through if from the other motor or motors. Since it is not practical to design a rocket motor with a thrust which begins smoothly at zero, the drag-compensating motors are ignited shortly after launch to begin with a finite thrust. This is permissible as long as the impulse of a moderate time interval is approximately equal and opposite to the drag impulse of the missile over the same time interval.

To aid in sighting the missile, a conventional telescopic sight 88 is mounted on top of the upright bracket 53 of the launcher.

In operating the missile shown in FIGS. 1 through 4, it is set on on the launcher as shown in FIG. 1, and the telescopic sight is used to aim the missile toward the target. The spacer rods establish the correct angle of elevation of the spin axis of the main rocket motor. The spin-up motor is ignited by conventional means (not shown) to rotate the main rocket motor at a high rate of speed. Exhaust gases from the spin-up motor are discharged through the side vents in the missile housing. After the main motor is brought up to speed and the spin-up motor has burned out, the main rocket motor is ignited by conventional means (not shown) to launch the missile along its main longitudinal axis. The inertia of the slip ring, or the tabs 49, causes it to slide back over the side vents and seal them. As the outer tail sleeve moves forward, its rear end picks up the forward end of the inner tail sleeve. The tail fin assembly 74 remains in the position shown in FIG. 1 until its tapered hub is picked up by the rear end of the inner tail sleeve, and pulled forward off over the forward ends of the spacer rods. The hub knocks the cap 72 off of the chamber 70 at the rear end of the inner tail sleeve, permitting the releasably mass to be discharged through the orifice 73. The releasing of the mass 71 in the chamber 70 requires a finite length of time, during which the releasable mass provides a restoring moment opposing any tendency for the missile to veer or yaw from its intended course. As the missile picks up speed, the releasable mass is ejected from the tail, and the center of gravity of the missile is now identical with that of the main rocket motor, which is located at point 31 of the spherical bearings 16 and 30.

At no time during flight can interference between the spinning main motor and the missile housing be tolerated. Thus, it is desirable to keep the maximum swivel angle of the missile housing with respect to the main motor at a minimum so that the volume of the motor and propellant can be at a maximum. The releasable mass on the tail of the missile reduces the first swivel amplitude. Since the instant of occurrence of the first swivel amplitude can be predicted with satisfactory accuracy, the releasable mass is released by the mechanical means just described, or it can be done alternatively by an electrical timer or integrating accelerometer as described below with respect to FIG. 5, or by any other suitable means. The same signal which releases the releasable mass may also be used to arm the war head, if the payload is a war head, and also to ignite the drag compensating motor or motors.

The star-shaped body of the rocket propellant provides a slightly decreasing thrust as the propellant is burned up, thus maintaining a substantially constant ratio of thrust of the main motor to the weight of the missile.

Shortly after launch, the drag-compensating rocket motors are ignited, say, by any conventional means (not shown), such as a delay fuse operated in response to ignition of the main rocket motor. Since the missile is aerodynamically stable, it tends to head into any cross wind which may be present, and the drag-compensating motors provide the required thrust to prevent drift of the missile from its intended path due to the cross wind. In addition to making the missile insensitive to cross winds, drag compensation provides the additional advantage that the main rocket motor operates in a substantially gravity-free environment, i.e., no tranverse forces act on the spinning main motor with the result that there is little, if any, precession of the main motor which might otherwise be caused, say, due to the shifting of its center of gravity due to uneven burning of propellant in the motor.

Even if the missile tends to head off course, the spinning main rocket motor keeps its spin axis aligned along the initial direction, and carries the missile in a straight line to the target.

As the propellant in the main rocket motor burns away, the spin rate of the main motor increases moderately, and thus improves the stability of the spin axis of the main motor. Due to decreasing combustion pressure and diminishing propellant weight during operation, the moderate increase of centrifugal acceleration of the propellant due to the increasing spin rate of the main rocket motor is permissible without requiring an increase in the main motor wall thickness, thereby avoiding an increase in total weight of the missile.

The missile shown in FIG. 5 is similar in many respects to that shown in FIGS. 1 through 3, and like reference numerals are used to idetntify like elements. The principal difference in the missile shown in FIG. 4 is that the spike 18 extends all the way through the main rocket motor 14 and terminates at its rear end in a drag-compensating motor 100, which has a pair of diametrically opposed nozzlies 102 which open rearwardly and outwardly away from the longitudinal axis of the missile. This eliminates the need for any drag-compensating motors on the exterior of the missile housing and improves its aerodynamic characteristics. An enlarged spherical bearing race 104 is formed in the intermediate portion of the spike 18 and has its center located at point 31, which is the center of gravity of the missile and the main rocket motor. An annular bearing 106 with a spherical surface 107 is secured to the interior of the rocket motor to ride against the rear of the spherical bearing surface 104.

Side vents 108 are formed in the missile housing around the spin-up motor in the form of turbine blades curved to impart a torque on the housing to cause it to rotate in the same direction as the spin-up motor, but at a much slower rate. The missile housing is supported by conventional bearings (not shown) which permit it to rotate prior to launch.

The arrangement shown in FIG. 5 has the advantage that no structural vanes or other members pass through the jet range of the main motor, which simplifies the design of the missile and eliminates perturbing forces from the nozzles on the main motor. On the other hand, since the spike passes through the center bearing, the bearing must be relatively large which, in turn, causes higher friction torques for spinning and swiveling. However, this friction is used to impart the desired rotation to the missile housing.

Since the minimum diameter of the spike which supports the drag-compensating motor at its rear end is determined by the stiffnes requirement of the tail installation, it is advantageous to make the spike of a material with a large modulus of elasticity, for example, beryllium or a beryllium alloy. Moreover, the amount of material required to achieve the desired rigidity for the tail provides the necessary structure for the coaxial drag-compensating motor.

The increase in spin rate of the missile shown in FIG. 5 during flight is caused by the spin friction torque of the center bearing which is approximately the right order of magnitude. The spin rate of the missile is monitored or controlled additionally aerodynamically by the radial fins in the tail fin assembly.

The releasable mass 71 in th etail chamber 70 is disposed in a flexible bag 109 of, say, polyethylene plastic. When the tail is jerked forward at launching of the missile, the mass ruptures the bag, permitting the mass to flow out orifice 73. Alternatively, when the tail slides through hub 77 in the tail fin assembly, it trips a trigger 110 on a combination mechanical timer or integrating accelerometer and signal generator 111 in the tail inner sleeve, which detonates a squib 112 imbedded in the mass to rupture the bag. The signal from the generator is also used to activate an igniter 113 in the drag-compensating motor.

FIG. 5 also shows an alternate arrangement for insuring sealing of the side vents 46 by slip ring 48, which is restrained by an overridable stop 114 pivoted at its lower end to a base 115 and urged in a rearward direction by a tension spring 116 against a stop 117 on the base 115.

I claim:

1. A missile comprising a payload, a housing secured to the payload and extending rearwardly of the payload and having an exhaust opening spaced rearwardly of the payload, a main rocket motor in the housing rearwardly of the payload for providing substantially all forward motive power for the missile and having discharge nozzle means directed toward the housing exhaust opening, swivel bearing means in the housing mounting the main rocket motor for spinning and swivelling movement of the motor relative to the housing about the center of gravity of the missile and of the motor, means coupled to the main rocket motor for rotating the main motor, and a tail assembly disposed coaxially of the missile rearwardly of the main rocket motor.

2. A missile according to claim 1 wherein the swivel bearing means mounts the main motor to the housing at essentially a single point coincident with the centers of gravity of the missile and the main motor.

3. A missile according to claim 2 wherein the bearing means comprises a member mounted to the housing and having a substantially spherically curved portion arranged convex to the housing exhaust opening and substantially concentric to the missile center of gravity, and means carried by the main rocket motor engaged with said spherically curved portion for mounting the motor to the member for said spinning and swivelling movement.

4. A missile according to claim 3 wherein the member has an end spaced rearwardly from the payload and said spherically curved portion is substantially at said end.

5. A missile according to claim 3 wherein the main rocket motor has an annular configuration, the member extends axially of the missile rearwardly of the payload to an end, the main rocket motor is disposed about the member, and said spherically curved portion of the member lies between the payload and the end of the member.

6. A missile according to claim 5 wherein the bearing means member is made from a material selected from the group consisting of beryllium and beryllium alloys.

7. A missile according to claim 1 wherein the main rocket motor is configured and arranged to produce a thrust which is related to the weight of the missile by a substantially constant ratio in operation of the main rocket motor.

8. A missile according to claim 1 wherein the main rocket motor discharge nozzle means includes at least two discharge nozzles arranged to exert on the motor a torque about the spin axis of the motor.

9. A missile according to claim 1 wherein the main rocket motor has an intermediate portion of greater cross-sectional area than the ends of the motor.

10. A missile according to claim 9 wherein the main rocket motor has a rear end having approximately spherical curvature concentric to the point where the motor is mounted for said spinning and swivelling movement.

11. A missile according to claim 10 wherein the discharge nozzle means is substantially flush with the spherical rear end of the main rocket motor.

12. A missile according to claim 1 wherein the tail assembly is constructed for telescoping coaxially of the missile and is arranged so that the missile center of gravity substantially coincides with that of the motor when the tail assembly is extended.

13. A missile according to claim 12 wherein the tail assembly comprises a plurality of concentric tubes slidable longitudinally of each other in response to launching of the missile into an extended condition of the tail assembly, and stop means for preventing disengagement of the tubes in extension of the tail assembly.

14. A missile according to claim 13 wherein the stop means includes means for absorbing shock energy attendant to extension of the tail assembly from a collapsed condition thereof.

15. A missile according to claim 12 including a fin assembly carried at the rear end of the extended tail assembly during flight of the missile.

16. A missile according to claim 15 wherein the fin assembly includes fins extending outwardly from the axis of the missile and having a selected angle of attack in a common deviation relative to the missile axis to impart rotational torque to the missile in flight.

17. A missile according to claim 1 including means mounting the tail assembly to the housing rearwardly of the main rocket motor, the tail mounting means including a plurality of vanes disposed radially of the missile axis from the tail assembly to the housing across the housing exhaust opening, each vane being shaped so its aerodynamic drag in the exhaust from the main rocket motor increases with distance from the axis of the missile in such manner that the resultant drag from all vanes coincides with the axis about which the main rocket motor spins relative to the housing.

18. A missile according to claim 5 wherein the tail assembly is mounted to the end of the bearing means member rearwardly of the main rocket motor.

19. A missile according to claim 1 including a releasable mass carried by the tail assembly, and means for releasing the mass from the tail assembly when the missile is in flight.

20. A missile according to claim 19 including means operable in response to commencement of flight of the missile for operating the weight releasing means.

21. A missile according to claim 20 wherein the mass is disposed and sized relative to the missile so that the center of gravity of the missile is rearwardly of the bearing means when the mass is present and so that the center of gravity of the missile substantially coincides with the center of gravity of the main rocket motor substantially at the bearing means when the mass is released from the missile.

22. A missile according to claim 21 wherein the releasable mass is comprised of a quantity of liquid.

23. A missile according to claim 21 wherein the releasable mass is comprised of a quantity of particles of solid material.

24. A missile according to claim 21 wherein the tail assembly is constructed of a plurality of elements arranged for telescoping coaxially of the missile from a collapsed condition thereof to an extended condition thereof when the missile is in flight, extension of the tail assembly occurring as the missile is launched, one of said elements extending essentially to the extreme rear of the missile in the extended condition of the tail assembly, and wherein the releasable mass is carried by said one element at substantially the rear end thereof.

25. A missile according to claim 24 wherein the means for operating the weight releasing means is operable in response to extension of the tail assembly.

26. A missile according to claim 21 including a rupturable container within which the releasable mass is carried, and wherein the mass releasing means includes a squib for rupturing the container.

27. A missile according to claim 1 wherein the means for rotating the main rocket motor includes a spin-up rocket motor secured to the main rocket motor for rotating the main motor about a spin axis.

28. A missile according to claim 27 wherein the housing defines side vents for exhausting from the housing gas discharged from the spin-up rocket motor.

29. A missile according to claim 28 including means for closing the side vents.

30. A missile according to claim 29 wherein the side vent closure means includes a slip ring disposed around the housing and mounted for slidable movement longitudinally of the housing into closure relation to the side vents.

31. A missile according to claim 30 wherein the slip ring has a substantially conical interior surface and the exterior surface of the housing has a substantially conical configuration for mating with the interior surface of the slip ring to hold the slip ring in closure relation to the side vents.

32. A missile according to claim 30 including a launcher for the missile and stop means mounted to the launcher to extend into the path of the ring and to move the ring into closure relation to the side vents when the missile is launched.

33. A missile according to claim 30 including a launcher for the missile, and rupturable tabs connected between the slip ring and the launcher for moving the ring over the side vents when the missile is launched and for rupturing after the side vents are closed.

34. A missile according to claim 30 wherein the side vents are arranged so that discharge gas from the spin-up rocket motor passing therethrough imparts on the housing a torque tending to rotate the housing in the same direction as the spin-up rocket motor.

35. A missile according to claim 28 wherein the side vents are shaped so that discharge gas from the spin-up rocket motor passing therethrough imparts a minimum torque upon the housing.

36. A missile according to claim 27 wherein the spin-up rocket motor includes at least two propellant chambers configured as segments of a toroid and disposed around the spin axis of the main rocket motor, and a separate discharge nozzle for each chamber of the spin-up rocket motor.

37. A missile according to claim 36 including pressure equalization tubes interconnected between the spin-up rocket motor propellant chambers.

38. A missile according to claim 1 including a drag-compensating rocket motor secured to the missile and arranged to exert a thrust to the rear of the missile in operation thereof.

39. A missile according to claim 38 wherein the main rocket motor has an annular configuration, a shaft fixedly mounted relative to the payload and extending rearwardly of the payload axially of the missile, the swivel bearing means is connected between the main rocket motor and the shaft rearwardly of the payload, the drag-compensating rocket motor is secured to the shaft rearwardly of the bearing means, and the tail assembly is carried by the shaft rearwardly of the drag-compensating motor.

40. A missile according to claim 38 wherein the tail assembly is constructed for telescoping extending movement rearwardly of the missile during and in response to launching of the missile, and means responsive to extension of the tail assembly for operating the drag-compensating rocket motor.

References Cited by the Examiner

UNITED STATES PATENTS

| | | | |
|---|---|---|---|
| 2,055,765 | 9/1936 | Hayden | 102—50 |
| 2,397,114 | 3/1946 | Anzalone | 102—491 X |
| 2,426,239 | 8/1947 | Renner | 102—38 |
| 2,497,084 | 2/1950 | Irby | 89—1.01 |
| 2,787,218 | 4/1957 | Anthony | 102—49 |
| 2,816,721 | 12/1957 | Taylor | 60—35.6 X |
| 2,843,020 | 7/1958 | Bertagna et al. | 89—1.7 |
| 2,968,454 | 1/1961 | Merrill et al. | 102—49 X |
| 2,968,996 | 1/1961 | Strickland et al. | 89—1.7 |
| 2,995,894 | 8/1961 | Baxter et al. | 60—35.54 |
| 3,045,596 | 7/1962 | Rae | 102—50 |
| 3,067,682 | 12/1962 | Feldmann et al. | 102—49 |
| 3,195,462 | 7/1965 | Petre | 102—49 |

BENJAMIN A. BORCHELT, *Primary Examiner.*

SAMUEL W. ENGLE, FRED C. MATTERN, Jr.,
*Examiners.*